(12) United States Patent
Ernst et al.

(10) Patent No.: US 6,578,903 B2
(45) Date of Patent: Jun. 17, 2003

(54) STRUCTURE FOR THE ABSORPTION OF IMPACT ENERGY

(75) Inventors: Ansgar Ernst, Weil de Stadt (DE); Christian Mauritz, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/976,270

(22) Filed: Oct. 15, 2001

(65) Prior Publication Data

US 2002/0053815 A1 May 9, 2002

(30) Foreign Application Priority Data

Oct. 13, 2000 (DE) .......................................... 100 50 689

(51) Int. Cl.[7] .............................................. B60R 13/02
(52) U.S. Cl. ....................................... 296/189; 280/751
(58) Field of Search ................................. 296/188, 189; 280/751

(56) References Cited

U.S. PATENT DOCUMENTS 3,936,090 A * 2/1976 Aya et al. ............... 280/751 X
5,163,730 A * 11/1992 Welch ......................... 296/189
5,564,744 A 10/1996 Frost ........................... 280/751
6,095,593 A * 8/2000 Johann et al. ............... 296/189

FOREIGN PATENT DOCUMENTS

| DE | 3108759 | 9/1982 |
| DE | 224546 | 7/1985 |
| DE | 19735068 | 2/1999 |
| EP | 0 955 227 A2 | 10/1999 |

\* cited by examiner

*Primary Examiner*—Dennis H. Pedder
(74) *Attorney, Agent, or Firm*—Crowell & Moring LLP

(57) ABSTRACT

A structure for absorbing impact energy in the interior of a vehicle that reduces a passenger's risk of injury. Said structure is disposed in the interior of a vehicle between the vehicle body and the trim and serves to protect a passenger from impacting against parts of the vehicle body. The structure exhibits, in its cross section, areas of different rigidity whereby at least one portion of the impact energy is transformed into rotational energy such that the impacting passenger is rolled off the trim in a direction away from an area of the vehicle interior posing a high risk of injury to the passenger.

23 Claims, 2 Drawing Sheets

STRUCTURE FOR THE ABSORPTION OF IMPACT ENERGY

BACKGROUND AND SUMMARY OF THE DISCLOSURE

This application claims priority of German Patent Document No. DE 100 50 689.5, filed on Oct. 13, 2001, the disclosure of which is expressly incorporated by reference herein.

The invention relates to a structure, which is intended for the absorption of impact energy and is disposed in the interior of a motor vehicle and serves to protect a passenger from impacting against parts of the vehicle body.

It is known to attach deformation elements at critical points in the interior of a motor vehicle. Said deformation elements serve to absorb a passenger's energy of impact at these critical points on the interior of the vehicle body and to thus reduce the risk of injury caused by such an impact. Such deformation elements are made, for example, of foam, which is disposed behind the interior trim.

Furthermore, it is known from the U.S. Pat. No. 5,564,744 to provide a deformation element in the form of a deformable tube to secure a pillar in the interior of the motor vehicle. Said deformation element is deformed elastically during impact and unfolds again like a spring after making impact. In this way, the elastic deformation absorbs the impact energy.

The European Patent Document No. EP 0 955 227 A2 also describes a deformation element in the form of a tube, which is disposed between a post of the car body and a trim of the vehicle. In the case of this prior art deformation element, the rigidity of the walls of the tube can be set and adapted as a function of the place of application in the interior of the vehicle.

An object of the present invention is to provide an absorption structure that effectively absorbs the impact energy when a passenger impacts against parts of the interior of a vehicle body, such as structural member parts, for example, pillars, and thus reduces the risk of injury to the passenger of the vehicle.

Such a problem is solved by the inventive structure, which is intended for the absorption of impact energy and is disposed in the interior of a vehicle between the body and the trim and is characterized in that it exhibits in its cross section, different areas of different rigidity. The different areas of different rigidity have the advantage that, when the passenger impacts against the structure of the invention, said structure reacts to the impact differently in its different areas of different rigidity, such that more rigid areas will deform less severely than less rigid areas. Correspondingly the impacting part of the passenger penetrates further into the softer part of the absorption structure than into the harder part. With this configuration, the softer part of the inventive structure absorbs the kinetic energy of the impacting passenger by means of a deformation while at the same time, in the harder part of the structure, the force of the impacting passenger is transformed into rotational energy. In this way, said passenger is twisted when bouncing off the energy-absorbing inventive structure in a direction that is optimal for avoiding severe injuries.

According to a preferred embodiment, the energy-absorbing structure exhibits a more rigid area, to which a less rigid area adjoins. This embodiment of the energy-absorbing structure guarantees that the impact energy is absorbed over the more rigid area by means of deformation. At the same time the less rigid area, adjoining said more rigid area, gives way. Energy is also absorbed due to this deforming resilience. In this way, the impacting body part of the passenger rolls away from the harder area in the direction of the softer area. Thus, the result is an automatic rotation, due to which the impacting part of the passenger's body can be moved away from the critical areas thus reducing a risk of injury.

It has proved especially advantageous, if the inventive structure for absorbing the impact energy is made of sheet metal. By using this material the contour shape of the structure is easy to produce by bending. The more rigid area can be realized, for example, by means of an S-shaped segment, whereas the less rigid area is a planar, non-supported segment.

The different rigidities can also be realized by means of different thicknesses of sheet metal. Another possibility lies in the reinforcement of individual areas of the plates by means of lock beading.

According to another embodiment, the inventive structure is mounted on an A pillar of a motor vehicle and in particular in the area against which a passenger's head can possibly impact in the event of an accident.

It has proved especially advantageous when the more rigid area of the absorption structure is assigned to such parts of the vehicle body that constitute a higher risk with respect to the risk of injury, such as the door stop (door catcher). Thus, it is guaranteed that the part that impacts against the structure of the invention is moved away specifically from this place by means of the described transformation into rotational energy.

The structure can exhibit an area with which it is fastened to the body of the motor vehicle. If this area is molded directly to the structure, the results offer special advantages during production and assembly, because no additional joint elements are necessary, thus saving a significant expense. This area that is molded on can be fastened, for example, with the aid of the already existing door stop to the vehicle body—here the A pillar post. The results are additional cost advantages.

Since the structure, according to the invention, is not solid, such as the foam elements described previously, there are, besides the already listed advantages, the possibility of integrating other functional elements, such as a safety strap of a side bag.

Other objects, advantages and novel features of the present invention will become apparent from the following detailed description of the invention when considered in conjunction with the accompanying drawings.

BRIEF DESCRIPTON OF THE DRAWINGS

DETAILED DESCRIPTION OF THE DRAWINGS

Figure 1:
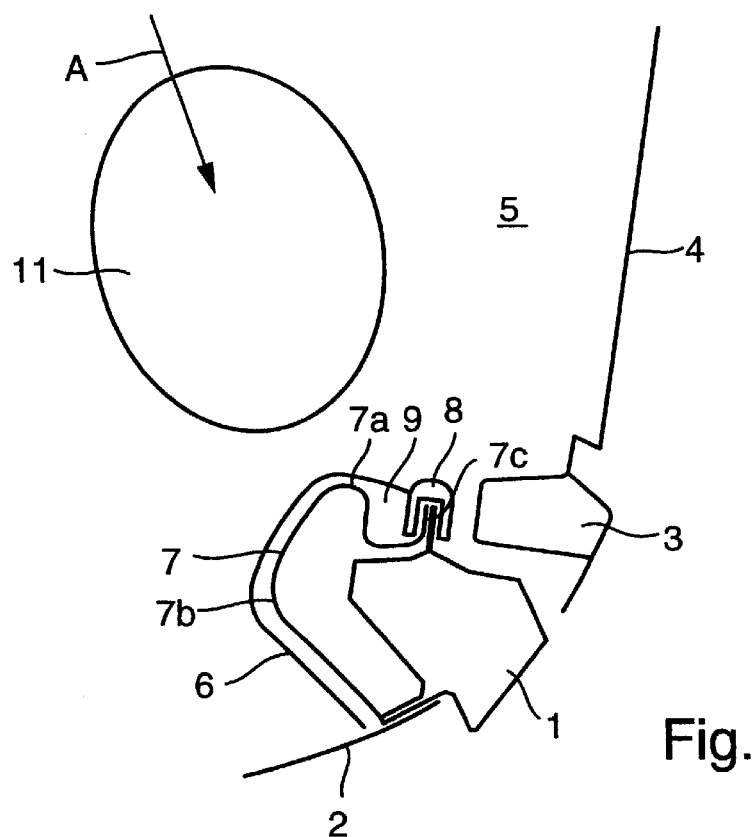
FIG. 1 is a cross sectional view of an A pillar with the adjoining panes (windshield pane, side window pane) and an absorption structure constructed according to a preferred embodiment of the invention shown before impact of a passenger's head.

FIG. 1 is a cross sectional view of an A pillar 1. A windshield pane 2 is attached to the one side of the A pillar 1. On the other side of the A pillar, first a door frame 3 and to it in turn a side window pane 4 are connected. The A pillar 1 is covered with a trim 6 in the direction of the vehicle interior 5. Said trim serves primarily visual purposes. However, the trim 6 is arranged in such a manner in front of the A pillar 1 that between it and the A pillar 1, a cavity is produced in which parts can be arranged such as the absorption structure 7 of the invention. The absorption structure 7 is made preferably of sheet metal that can be bent into the desired shape.

Figure 3:
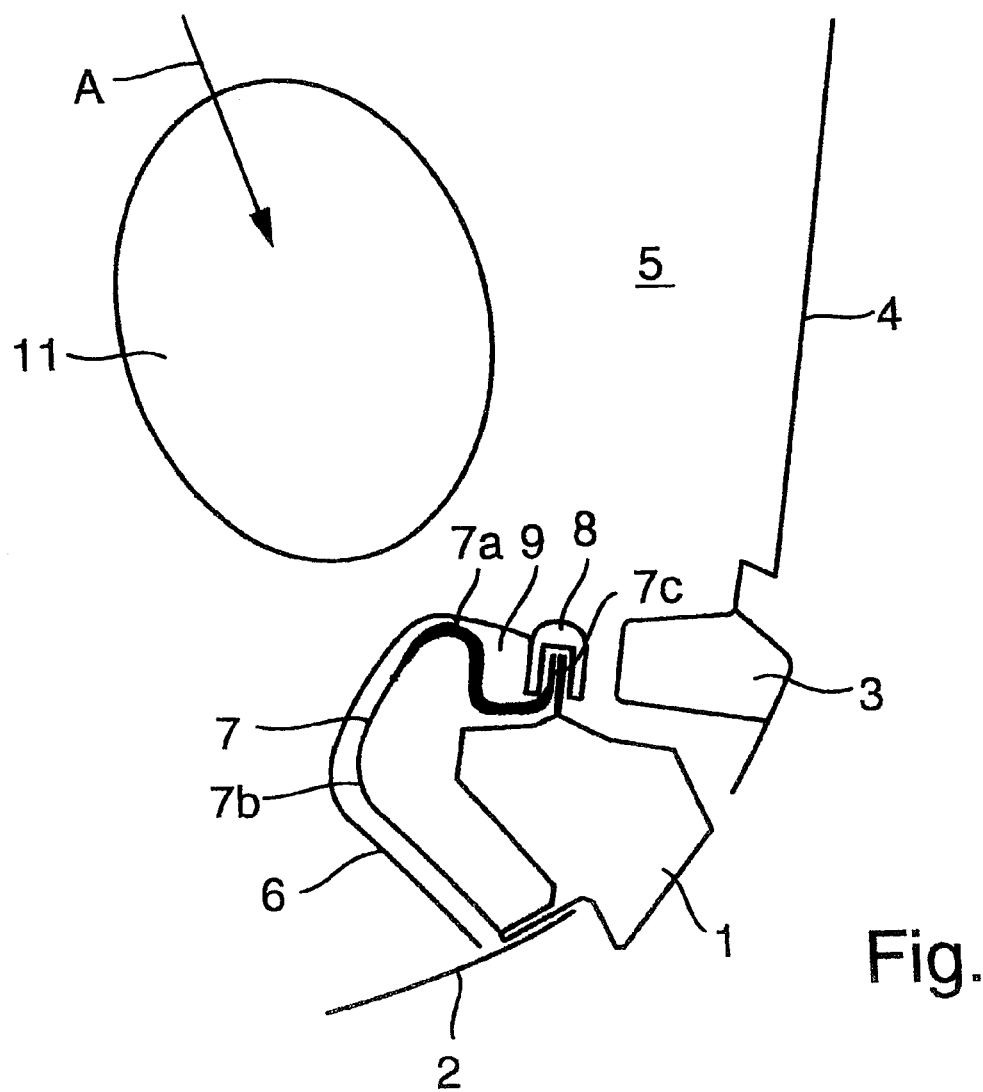
FIG. 3 is a cross sectional view of a pillar with an absorption structure constructed according to another preferred embodiment of the invention shown before impact.

The illustrated embodiment, the sheet metal 7 exhibits an S-shaped bent area 7a and an adjoining area 7b, which follows the contour of the A pillar 1, is not bent very much and is not supported. The S-shaped area is more rigid, whereas the less bent, non-supported area is less rigid. The areas of different rigidities may include at least one area reinforced by corrugation. In the embodiment shown in FIG. 1, the S-shaped area can be considered as a corrugated area. Alternatively, any area of the sheet metal may be a corrugated area for the purpose of reinforcement, for example. The different rigidities can also be realized by different thicknesses of sheet metal. As shown in FIG. 3, the bent area 7a is thicker and therefore is more rigid than the other areas of the sheet metal 7.

Over one end 7c of the sheet metal 7, here the end, where the S-shaped area is located, the structure 7 of the invention is fastened to the A pillar with the aid of a door stop 8. Fastening the sheet metal structure 7 directly over the segment 7c of the sheet metal has the advantage that no additional fastening element, besides the already existing door stop 8, is necessary. The fastening of the sheet metal 7 is possible by means of rolling during door stop assembly.

Since the structure 7 of the invention is not solid, it occupies only a portion of the cavity between the A pillar 1 and the trim 6. Thus, not only the sheet metal 7, but other elements can be integrated into this cavity. For example, a safety strap for a side bag, which is pulled, upon triggering the airbag, out of the cavity 9 past the trim, can be integrated into a space 9, formed by means of the S-shaped segment 7a and the trim 6.

FIG. 1 shows as a schematic drawing not only the cross section of the A pillar 1 but also a head 11 of a passenger. The arrow A indicates the direction, from which the head 11 of the passenger moves in the direction of the A pillar.

Figure 2:
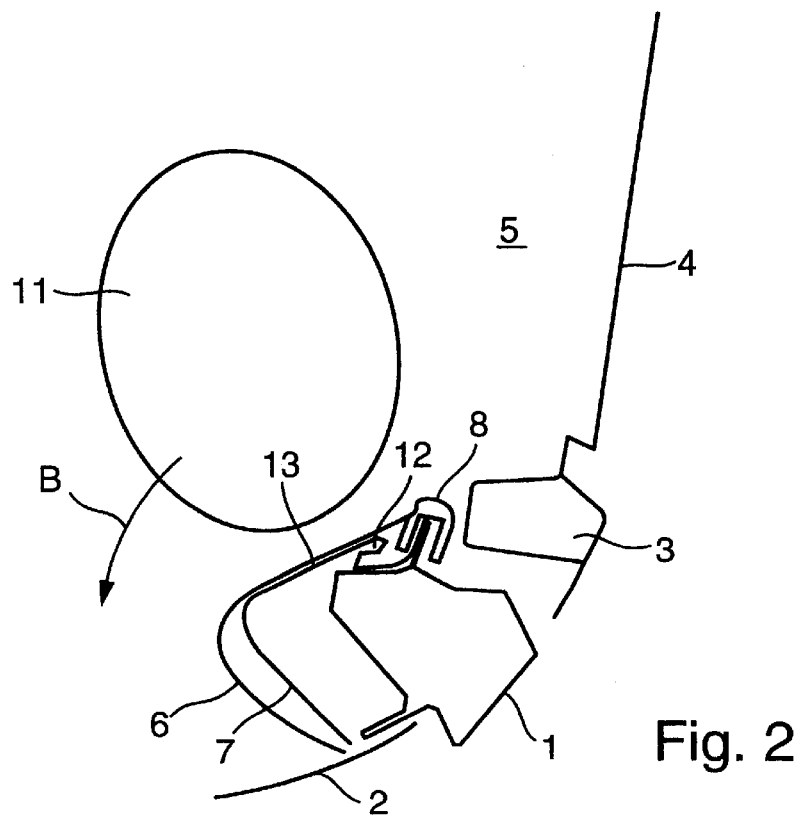
FIG. 2 is a cross sectional view of an A pillar with the absorption structure according to FIG. 1, shown after impact of a passenger's head.

FIG. 2 shows the same cross section of an A pillar 1 with a windshield pane 2, a door frame 3, a side window pane 4 and a trim 6 after impact of a passenger's head. A deformation of the sheet metal 7 can be clearly perceived. The segment 7a that is bent into the shape of an S has folded together (fold deformation 12). However, the less rigid segment 7b also exhibits a planar deformation (surface deformation 13).

Thus, upon impact of the passenger's head with the structure of the present invention, one part of the impact energy is absorbed by the folding together of the S-shaped segment 7a, while another part is absorbed by the planar deformation of the less rigid segment of the sheet metal insert 7b.

The segment 7a opposes the impacting head 11 with more force than the less rigid segment 7b. Thus, during impact, the head 11 penetrates further into the less rigid segment 7b and is thus subjected to twist when the head 11 rolls away in the direction of the arrow B. In this manner, the impact energy is transformed at least to some extent into rotational energy and prevents the head from bumping against the protruding door stop 8. The risk of injury is significantly reduced by means of the solution of the invention in this area of the vehicle interior.

The foregoing disclosure has been set forth merely Ato illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Structure for absorbing impact energy in an interior of a vehicle body,
    wherein said structure is situated between said interior of the vehicle body and a trim of the vehicle body and serves to protect a passenger from impacting against parts of the vehicle body, and
    wherein said structure has more rigid and less rigid areas, whereby when an object impacts the structure, the more rigid area opposes movement of the object causing the object to roll into the less rigid area, wherein the more rigid area is S-shaped and the S-shaped more rigid area is designed to fold together upon impact.

2. Structure for absorbing impact energy according to claim 1,
    wherein the more rigid area is in parts of the vehicle body which pose a high risk of injury upon impact.

3. Structure for absorbing impact energy according to claim 1,
    wherein the more rigid area is made of bent sheet material and is curved.

4. Structure for absorbing impact energy according to claim 3,
    wherein the sheet material includes sheet metal.

5. Structure for absorbing impact energy according to claim 1,
    wherein the structure has a fastening segment for fastening the structure to the vehicle body.

6. Structure for absorbing impact energy according to claim 1,
    wherein the less rigid area has a planar, non-supported segment.

7. Structure for absorbing impact energy according to claim 1,
    wherein the structure is comprised of different thicknesses of sheet metal at respective ones of the areas of different rigidity.

8. Structure for absorbing impact energy according to claim 1,
    wherein the areas of different rigidity include at least one area reinforced by corrugation.

9. Structure for absorbing impact energy according to claim 1,
    wherein the structure is mounted on a pillar of the vehicle body in an area where a passenger's head may impact during a collision.

10. Structure for absorbing impact energy according to claim 9, wherein the pillar is an A pillar.

11. Structure for absorbing impact energy according to claim 10,
    wherein the structure is fastened to the A pillar with the aid of a door stop.

12. Structure for absorbing impact energy in a vehicle interior comprising:
    an interior structure member,
    a trim covering said interior structure member, a cavity between said interior structure member and said trim, and an absorption structure situated in said cavity and made of sheet material, wherein said absorption structure has a more rigid curved section and a less rigid section, wherein upon impact of a passenger's head on said trim, said more rigid curved section opposes movement of said passenger's head causing said passenger's head to roll into said less rigid section, wherein the more rigid area is S-shaped and the S-shaped more rigid area is designed to fold together upon impact of a passenger's head.

13. Structure for absorbing impact energy in a vehicle interior according to claim 12, wherein said sheet material is sheet metal.

14. Structure for absorbing impact energy in a vehicle interior according to claim 12, wherein said less rigid section is planar.

15. Structure for absorbing impact energy in a vehicle interior according to claim 12, wherein said interior structure member is a pillar.

16. Structure for absorbing impact energy in a vehicle interior according to claim 12, wherein said interior structure member is an A-pillar.

17. Structure for absorbing impact energy in a vehicle interior according to claim 16, wherein said absorption structure is fastened to said A-pillar by a door stop.

18. Structure for absorbing impact energy in a vehicle interior according to claim 17, wherein said absorption structure is configured such that upon impact by a passenger's head, the passenger's head is rolled in a direction away from said door stop when said passenger's head is rolled from the more rigid curved section to the less rigid section of the absorption structure.

19. Method for making a structure for absorbing impact energy in a vehicle interior comprising the steps of:

covering a vehicle body interior structure member with a trim such that a cavity is formed between said interior structure member and said trim, inserting an absorption structure made of sheet material in said cavity and shaping said sheet material to bend along inside contours of said trim such that the absorption structure has a less rigid planar section and a more rigid curved section, wherein the more rigid area is S-shaped and the S-shaped more rigid area is designed to fold together upon impact of a passenger's head.

20. Method for making a structure for absorbing impact energy in a vehicle interior according to claim 19, wherein said sheet material is sheet metal.

21. Method for making a structure for absorbing impact energy in a vehicle interior according to claim 19, wherein said vehicle body interior structure member is a pillar.

22. Method for making a structure for absorbing impact energy in a vehicle interior according to claim 19, wherein said vehicle body interior structure member is an A-pillar.

23. Method for making a structure for absorbing impact energy in a vehicle according to claim 22, wherein said absorption structure is fastened to said A-pillar with a door stop.

* * * * *